(12) United States Patent
Yang et al.

(10) Patent No.: US 7,828,957 B2
(45) Date of Patent: Nov. 9, 2010

(54) OLEFIN WAXES HAVING IMPROVED HARDNESS OR VISCOSITY

(76) Inventors: Hu Yang, 3123 Red Ridge Ct., Manvel, TX (US) 77578; Eduardo J Baralt, 3822 Wildwood Valley Ct., Kingwood, TX (US) 77345; Willie J Isom, 2319 Pine Cone Dr., Kingwood, TX (US) 77339; Ronald G Abbott, 3923 Laurel Rock Dr., Kingwood, TX (US) 77345

(*) Notice: Subject to any disclaimer, the term of this patent is extended or adjusted under 35 U.S.C. 154(b) by 0 days.

(21) Appl. No.: 12/430,586

(22) Filed: Apr. 27, 2009

(65) Prior Publication Data

US 2009/0270664 A1  Oct. 29, 2009

Related U.S. Application Data

(63) Continuation of application No. 11/044,794, filed on Jan. 27, 2005, now Pat. No. 7,527,686, which is a continuation-in-part of application No. 10/996,331, filed on Nov. 23, 2004, now Pat. No. 7,341,619.

(51) Int. Cl.
  *C07C 27/12* (2006.01)
  *C08L 91/06* (2006.01)
  *C09D 191/06* (2006.01)
(52) U.S. Cl. .......................................... 208/3; 106/270
(58) Field of Classification Search ................ 106/270; 208/3
  See application file for complete search history.

(56) References Cited

U.S. PATENT DOCUMENTS

| | | | |
|---|---|---|---|
| 3,224,956 A | 12/1965 | Phillips et al. | |
| 3,316,105 A | 4/1967 | Feagin | |
| 3,644,130 A | 2/1972 | Evans et al. | |
| 3,901,789 A * | 8/1975 | Michael et al. | 208/33 |
| 3,941,608 A | 3/1976 | Ehrhardt et al. | |
| 3,994,737 A | 11/1976 | Bienvenu | |
| 4,004,932 A | 1/1977 | Bienvenu | |
| 4,180,408 A | 12/1979 | Bienvenu et al. | |
| 4,240,795 A | 12/1980 | Hendrix | |
| 4,342,602 A | 8/1982 | Petz et al. | |
| 4,426,229 A | 1/1984 | Bolton et al. | |
| 6,169,148 B1 | 1/2001 | Deckers et al. | |
| 6,348,547 B1 | 2/2002 | Deckers et al. | |
| 6,406,531 B1 | 6/2002 | Bui et al. | |
| 6,761,764 B2 | 7/2004 | Krendlinger et al. | |
| 2003/0091812 A1 | 5/2003 | Zubry | |
| 2005/0139039 A1 | 6/2005 | Larsson et al. | |

FOREIGN PATENT DOCUMENTS

| | | |
|---|---|---|
| DE | 1180131 | 10/1964 |
| FR | 2497513 | 7/1982 |
| GB | 918295 | 2/1963 |
| GB | 968960 | 9/1964 |
| GB | 1021701 | 3/1966 |
| WO | WO 01/85855 | 11/2001 |

OTHER PUBLICATIONS

Wolf, "Inference of Mechanical Properties from Instrumented Depth Sensing Indentation at Tiny Loads and Indentation Depths" Cryst. Res. Technol. 35(4):377-399 (2000).
"The Engineering Tool Box", Dynamic Absolute and Kinematic Viscosity, (May 11, 2004).
Publication No. 03167203, Patent Abstracts of Japan (Jul. 19, 1991).

* cited by examiner

*Primary Examiner*—David M Brunsman

(57) ABSTRACT

In one embodiment, we disclose hardened olefin waxes and processes for preparing them. In another embodiment, we disclose oxidized olefin waxes having low viscosity and processes for preparing them. The waxes are suitable for use as polishes, coatings, or inks, among other uses. For example, a hardened olefin wax composition produced from a feedstock olefin wax composition by contacting the feedstock olefin wax composition with an oxygen-containing gas at a temperature greater than a melting point of the feedstock olefin wax composition, the hardened olefin wax composition having: a needle penetration value at 25° C. at least 5 percent less than a needle penetration value at 25° C. of the feedstock olefin wax composition; a a kinematic viscosity at 100° C. of up to about 200% greater than the kinematic viscosity of the feedstock olefin wax composition; and a saponification number less than 5 mg KOH/g hardened olefin wax composition.

20 Claims, No Drawings

OLEFIN WAXES HAVING IMPROVED HARDNESS OR VISCOSITY

CROSS REFERENCE TO RELATED APPLICATIONS

The present application is a continuation application of U.S. patent application Ser. No. 11/044,794 filed on Jan. 27, 2005, which is entitled "Olefin Waxes Having Improved Hardness or Viscosity" now U.S. Pat. No. 7,527,686 and is a continuation-in-part of U.S. patent application Ser. No. 10/996,331 filed Nov. 23, 2004 now U.S. Pat. No. 7,341,619. U.S. patent application Ser. No. 10/996,331 is hereby incorporated herein by reference in its entirety for all purposes.

BACKGROUND OF THE INVENTION

The present invention relates generally to the fields of alpha olefin waxes. More particularly, it concerns alpha olefin wax composition having high hardness, or oxidized alpha olefin wax compositions having low viscosity.

Hydrocarbon waxes, such as alpha olefin waxes, paraffin waxes, microcrystalline waxes, polyethylene waxes, and Fisher-Tropsch waxes, are characterized by a set of basic physical property parameters, which are used to predict or correlate performance in specific applications. The most commonly cited wax physical properties are hardness, drop melting point, and viscosity. For most wax products, these fundamental properties are governed by the molecular weight. As relatively low molecular weight waxes, alpha olefin (AO) waxes are relatively soft, but have desirable high melt flow stemming from their low molecular weight. On the other hand, extremely hard waxes, such as polyethylene waxes, have desirable high physical strength, but their viscosity is usually undesirably very high due to their extremely high molecular weights.

For many wax applications, the physical strength, or the hardness of waxes, is one of the most important performance criterions in applications such as polishing (floor, furniture and automobile), coating (textile, fruit, paper), candle formulation, investment casting, and a range of industrial composite structures. It would be desirable to improve the physical strength of alpha olefin waxes for improved performance in current applications or use in applications for which they have not yet been suitable. Further, it would be desirable if an improvement in physical strength could be achieved with minimal impact on the low melt viscosity of the alpha olefin waxes. A low melt viscosity is a highly desirable process characteristic for any hydrocarbon wax to ensure adequate flow during the processing stage in many applications. A combination of high physical strength and low viscosity has been difficult to achieve in one wax product as physical strength and viscosity both generally have a positive correlation with molecular weight.

It is well known that a range of hydrocarbon waxes can be oxidized into functional waxes by reacting oxygen or oxygen-containing gas with waxes at elevated temperatures. The oxidation changes the chemical compositions via a free-radical mechanism, which converts hydrocarbon molecules of waxes into esters, acids, and other minor components. The resulting oxidized waxes can be suitable for a range of specific applications where either high polarity or functionality is required. Many applications require a substantial oxidation of the non-polar hydrocarbon waxes. As a result, many processes have been developed for maximizing the oxidation efficiency for a high level of oxidation. These processes include use of an autoclave reactor in a batch process, or a reaction column or tubular reactor in a continuous process. The typical saponification numbers of oxidized waxes can be similar to those of natural waxes. For example, the typical saponification numbers of oxidized waxes are in the range of 50-150 mg KOH/g, and typical acid numbers are in the range of 30-50 mg KOH/g.

For some specialty applications, oxidized waxes are desirable, as described in U.S. Pat. Nos. 3,901,789; 3,994,737; 4,004,932; 4,180,408; 4,240,795; 4,426,229; 6,169,148 and 6,348,547. However, oxidation of hydrocarbon waxes generally leads to compromised physical properties, such as higher viscosity, as well as discoloration from white to undesirably off-white color.

For a number of applications where an oxidized wax can be useful, it would be desirable to have an oxidized hydrocarbon wax with both adequate hardness and relatively low viscosity.

SUMMARY OF THE INVENTION

In one embodiment, the present invention relates to a process to produce a hardened olefin wax composition, comprising contacting a feedstock olefin wax composition comprising an olefin having at least 20 carbon atoms with an oxygen-containing gas at a temperature greater than the feedstock olefin wax composition melting point, to produce a hardened olefin wax composition, wherein the hardened olefin wax composition has a needle penetration value at 25° C. at least 5 percent less than the needle penetration value at 25° C. of the feedstock olefin wax composition.

The present invention also relates to the hardened olefin wax composition produced by the process.

In one embodiment, the present invention relates to a process to oxidize a feedstock olefin wax composition, comprising (a) contacting a feedstock olefin wax composition comprising an olefin having at least 20 carbon atoms with an oxygen-containing gas at a temperature greater than that of the feedstock olefin wax composition melting point, to prepare an oxidized olefin wax wherein the oxidized olefin wax composition has an acid number greater than 1 mg KOH/g oxidized olefin wax composition and a kinematic viscosity at 100° C. less than 70 cSt.

The present invention also relates to the oxidized olefin wax composition produced by the process.

The hardened olefin wax compositions generally have hardness at least as good as or better than the feedstock olefin wax composition. The oxidized olefin wax compositions generally have relatively low viscosity.

In another embodiment, the present invention relates to an alpha olefin wax composition, comprising an alpha olefin wax composition comprising an alpha olefin having at least 20 carbon atoms and at least one additive selected from the group consisting of an amide, imide, or mixture thereof, wherein the alpha olefin wax composition has a lower needle penetration value at 25° C. than an alpha olefin wax composition not comprising the at least one additive.

The hardened olefin wax compositions and the oxidized olefin wax compositions of the present invention can be used in a variety of applications, including, but not limited to, polishes (such as floor waxes, furniture waxes, or automobile waxes, among others), coatings (such as textile lubricants or controlled release agents, among others), or inks, among others.

DESCRIPTION OF ILLUSTRATIVE EMBODIMENTS

The invention relates to olefin wax compositions and the methods of making the olefin wax compositions. In some embodiments the olefin wax compositions comprise an additive. In other embodiments the olefin wax compositions have a hardness greater than the starting olefin wax composition. In yet other embodiments the invention relates to oxidized olefin wax compositions and methods of preparing the oxidized olefin wax compositions.

Additive-Hardened Wax Compositions

In one embodiment, the invention is an additive-hardened olefin wax composition comprising an olefin wax composition and at least one additive. The olefin wax composition may be any olefin wax composition as described herein. Generally, the additive comprises a moiety selected from the group consisting of an amide, imide, or mixture thereof. In some embodiments, the additive comprises an imide moiety. In yet other embodiments, the additive comprises an ethylene-bis-amide, ethylene-bis-imide, or mixtures thereof. Independently, in one embodiment, the additive is a stearamide. In one further embodiment, the additive is ethylene-bis-stearamide.

The additive-hardened wax composition can comprise any amount of the additive. In one embodiment, the additive-hardened wax composition comprises less than about 10 weight percent of the additive. In a further embodiment, the additive-hardened wax composition comprises less than about 6 weight percent of the additive. In still a further embodiment, the additive-hardened wax composition comprises less than about 4 weight percent of the additive. In yet a further embodiment, the additive-hardened wax composition comprises less than about 3 weight percent of the additive. In an even further embodiment, the additive-hardened wax composition comprises less than about 2 weight percent of the additive. In even still a further embodiment, the additive-hardened wax composition comprises less than about 1 weight percent of the additive.

Generally, the additive may function to increase the hardness of the additive-hardened wax composition relative to the olefin wax composition. One method that can be used to determine hardness is needle penetration. Needle penetration can be measured using ASTM D1321 and can be measured at any acceptable temperature. Unless stated otherwise, the needle penetrations discussed and presented throughout this specification will refer to the needle penetration as measured by ASTM D1321 at 25° C.

In an embodiment, the additive-hardened wax composition can have a lower needle penetration value at 25° C. than a reference composition consisting of the olefin wax composition. In some embodiments, the additive may function to reduce the needle penetration of the additive-hardened wax composition relative to the olefin wax composition. In one embodiment, the needle penetration of the additive-hardened wax composition is at least 5 percent less than the needle penetration of the olefin wax composition. In another embodiment, the needle penetration of the additive-hardened wax composition is at least 10 percent less than the needle penetration value of the olefin wax composition. In a further embodiment, the needle penetration of the additive-hardened wax composition is at least 20 percent less than the needle penetration value of the olefin wax composition. In still a further embodiment, the needle penetration of the additive-hardened wax composition is at least 30 percent less than the needle penetration value of the olefin wax composition. In yet a further embodiment, the needle penetration of the additive-hardened wax composition is at least 40 percent less than the needle penetration of the olefin wax composition. In still a further embodiment, the needle penetration of the additive-hardened wax composition is at least 50 percent less than the needle penetration value of the olefin wax composition. In general and as the skilled artisan will be aware, the absolute value of the needle penetration of the olefin wax composition, and the absolute reduction of the needle penetration as a result of the additive may depend on the specific composition of the olefin wax composition.

The additive-hardened wax composition may have a higher drop melt point than the olefin wax composition. Unless explicitly stated otherwise, all drop melt points referred to herein are measured according to ASTM D 127. In one embodiment, the drop melt point of the additive-hardened wax composition is at least 25 percent greater than the drop melt point of the olefin wax composition. In a further embodiment, the drop melt point of the additive-hardened wax composition is at least 50 percent greater than the drop melt point of the olefin wax composition. In still a further embodiment, the drop melt point of the additive-hardened wax composition is at least 75 percent greater than the drop melt point of the olefin wax composition. In yet a further embodiment, the drop melt point of the additive-hardened wax composition is at least 100 percent greater than the drop melt point of the olefin wax composition.

Hardened Olefin Wax Compositions

In another embodiment, the present invention relates to a hardened olefin wax composition, produced by a process comprising contacting a feedstock olefin wax composition with an oxygen-containing gas at a temperature greater than the feedstock olefin wax composition melting point. In another embodiment, the present invention relates to a hardened olefin wax composition, produced by a process comprising contacting a feedstock olefin wax composition with an oxygen-containing gas at a temperature greater than the feedstock olefin wax composition melting point wherein the hardened olefin wax composition has a needle penetration value at 25° C. at least 5 percent less than the needle penetration value at 25° C. of the feedstock olefin wax composition. In another embodiment, the present invention relates to a hardened olefin wax composition, produced by a process comprising contacting a feedstock olefin wax composition comprising an olefin having at least 20 carbon atoms with an oxygen-containing gas at a temperature greater than the feedstock olefin wax composition melting point wherein the hardened olefin wax composition has a needle penetration value at 25° C. at least 5 percent less than the needle penetration value at 25° C. of the feedstock olefin wax composition. Additional process steps and olefin wax product properties that may be used to further describe the hardened olefin wax composition are described herein. The feedstock olefin wax compositions which can be used in the process steps are further described herein.

The hardened olefin wax composition may also be described using additional qualitative and quantitative tests. For example, the hardened olefin wax composition may be defined by one or more of absolute needle penetration value, relative needle penetration value, acid number, saponification number, kinematic viscosity, or color, among others. Acid number values, when referred to herein, are measured according to ASTM D 974, unless explicitly stated to the contrary. All saponification numbers described herein are measured by ASTM D94, unless explicitly stated to the contrary. All kinematic viscosities are the 100° C. kinematic viscosities as measured by ASTM D445, unless explicitly stated to the contrary. All ASTM standards referred to herein are the most current versions as of the filing date of the present application.

Generally, the hardened olefin wax composition has a needle penetration value at 25° C. at least 5 percent less than the needle penetration value at 25° C. of the feedstock olefin wax composition. In one embodiment, the hardened olefin wax composition has a needle penetration at least 10 percent less than the needle penetration of the feedstock olefin wax composition. In a further embodiment, the hardened olefin wax composition has a needle penetration at least 20 percent less than the needle penetration of the feedstock olefin wax composition. In still a further embodiment, the hardened olefin wax composition has a needle penetration at least 30 percent less than the needle penetration of the feedstock olefin wax composition. In yet a further embodiment, the hardened olefin wax composition has a needle penetration at least 40 percent less than the needle penetration of the feedstock olefin wax composition. In still a further embodiment, the hardened olefin wax composition has a needle penetration at least 50 percent less than the needle penetration of the feedstock olefin wax composition.

Quantitatively, the hardened olefin wax composition can have an acid number of less than about 12 mg KOH/g hardened olefin wax composition. In one embodiment, the hardened olefin wax composition can have an acid number less than about 10 mg KOH/g hardened olefin wax composition. In a further embodiment, the hardened olefin wax composition can have an acid number less than about 5 mg KOH/g hardened olefin wax composition. In still a further embodiment, the hardened olefin wax composition can have an acid number less than about 2 mg KOH/g hardened olefin wax composition. In yet a further embodiment, the hardened olefin wax composition can have an acid number less than about 1 mg KOH/g hardened olefin wax composition.

Also quantitatively, the hardened olefin wax composition can have a saponification number of less than about 45 mg KOH/g hardened olefin wax composition. In one further embodiment, the hardened olefin wax composition has a saponification number less than about 25 mg KOH/g hardened olefin wax composition. In still a further embodiment, the hardened olefin wax composition has a saponification number less than about 15 mg KOH/g hardened olefin wax composition. In yet a further embodiment, the hardened olefin wax composition has a saponification number less than about 10 mg KOH/g hardened olefin wax composition. In even a further embodiment, the hardened olefin wax composition has a saponification number less than about 5 mg KOH/g hardened olefin wax composition. In another embodiment, the hardened olefin wax composition has a saponification number less than about 2.5 mg KOH/g hardened olefin wax composition.

Also quantitatively, the hardened olefin wax composition can have a kinematic viscosity up to about 500% greater than the kinematic viscosity of the feedstock olefin wax composition. In one further embodiment, the hardened olefin wax composition has a kinematic viscosity up to about 300% greater than the kinematic viscosity of the feedstock olefin wax composition. In still a further embodiment, the hardened olefin wax composition has a kinematic viscosity up to about 200% greater than the kinematic viscosity of the feedstock olefin wax composition. In yet a further embodiment, the hardened olefin wax composition has a kinematic viscosity up to about 150% greater than the kinematic viscosity of the feedstock olefin wax composition. In even a further embodiment, the hardened olefin wax composition has a kinematic viscosity up to about 100% greater than the kinematic viscosity of the feedstock olefin wax composition. In even still a further embodiment, the hardened olefin wax composition has a kinematic viscosity that is substantially unchanged relative to the kinematic viscosity of the feedstock olefin wax composition. By "substantially unchanged kinematic viscosity" is meant the kinematic viscosity is up to about 30% greater than the kinematic viscosity of the feedstock olefin wax composition.

Also quantitatively, the hardened olefin wax composition can have a drop melt point substantially unchanged relative to the drop melt point of the feedstock olefin wax composition. By "substantially unchanged drop melt point" is meant the drop melt point of the hardened olefin wax composition is from about 10% less than the drop melt point of the feedstock olefin wax composition to about 10% greater than the drop melt point of the feedstock olefin wax composition.

Qualitatively, the hardened olefin wax composition generally retains its white color. However, the invention encompasses hardened olefin wax composition colors ranging from white to light yellow.

Though the process of preparing the hardened olefin wax composition having a reduced needle penetration relative to the feedstock olefin wax composition involves contacting the feedstock olefin wax composition with an oxygen-containing gas, it has been discovered that conditions used to produce the hardened olefin wax composition described herein do not always significantly oxidize the olefin wax composition. Specifically, the low acid numbers and low saponification numbers observed for some embodiments of the hardened olefin wax composition indicate that a significant portion of the feedstock olefin wax composition is not oxidized. Thus, the hardened olefin wax composition may alternatively be described in terms of physical properties of the feedstock olefin wax composition which do not change significantly as a result of the oxygen-containing gas contact step in combination with properties of the hardened olefin wax composition properties which differ significantly from the properties of the feedstock olefin wax composition as a result of the oxygen-containing gas contact step. Examples of the feedstock olefin wax composition properties which do not change significantly as a result of the oxygen-containing gas contact step and which may be used either singly or in combination to describe the hardened olefin wax composition include feedstock olefin wax composition average molecular weight, average olefin molecular weight, feedstock olefin wax composition carbon number composition, or feedstock olefin wax olefin composition, among others. Examples of the hardened olefin wax composition properties which may differ measurably from the properties of the feedstock olefin wax composition as a result of the oxygen-containing gas contact step and which may be used either singly or in any combination to describe the hardened olefin wax composition include needle penetration, viscosity, drop melt point, acid number, and saponification number, among others. Thus, a combination of the feedstock olefin wax composition properties that do not change significantly due to contact with the oxygen-containing gas contact step and properties which may differ measurably due to contact with the oxygen-containing gas may be used to describe the hardened olefin wax composition. For example, in one non-limiting exemplary hardened olefin wax composition, the hardened olefin wax composition has an average molecular weight substantially the same as the feedstock olefin wax composition and a needle penetration 5 percent less than the needle penetration of the feedstock olefin wax composition. In a second non-limiting example of a hardened olefin wax composition, the hardened olefin wax composition comprises an olefin wax having an average olefin molecular weight from 260 grams/mole to 340 grams/mole and a needle penetration 30 percent less than the needle penetration of the feedstock olefin wax composition.

In one embodiment, the present invention relates to a hardened olefin wax composition having an average olefin molecular weight between 260 grams/mole and 340 grams/mole and a needle penetration value less than 100 dmm. When referring to hardened olefin wax compositions, the term "average olefin molecular weight" refers to the average molecular weight for all olefins in the hardened olefin wax composition. In other embodiments, the hardened olefin wax composition having an average olefin molecular weight between 260 grams/mole and 340 grams/mole has a needle penetration less than 90 dmm, alternatively less than 80 dmm, alternatively less than 70 dmm, and alternatively less than 60 dmm.

In another embodiment, the hardened olefin wax composition has an average olefin molecular weight between 280 grams/mole and 320 grams/mole and a needle penetration value less than 100 dmm. In other embodiments, the hardened olefin wax composition having an average olefin molecular weight between 280 grams/mole and 320 grams/mole has a needle penetration less than 90 dmm, alternatively less than 80 dmm, alternatively less than 70 dmm, and alternatively less than 60 dmm.

In another embodiment, the hardened olefin wax composition has an average olefin molecular weight between 290 grams/mole and 310 grams/mole and a needle penetration value less than 100 dmm. In other embodiments, the hardened olefin wax composition having an average olefin molecular weight between 290 grams/mole and 310 grams/mole has a needle penetration less than 90 dmm, alternatively less than 80 dmm, alternatively less than 70 dmm, and alternatively less than 60 dmm.

The hardened olefin wax composition may also have an acid number, saponification number, color or combination of these as described above.

In one embodiment, the present invention relates to a hardened olefin wax composition having an average olefin molecular weight between 330 grams/mole and 420 grams/mole and a needle penetration value less than 35 dmm. In other embodiments, the hardened olefin wax composition having an average olefin molecular weight between 330 grams/mole and 420 grams/mole has a needle penetration less than 30 dmm, alternatively less than 25 dmm, and alternatively less than 20 dmm.

In another embodiment, the hardened olefin wax composition has an average olefin molecular weight between 350 grams/mole and 400 grams/mole and a needle penetration value less than 35 dmm. In other embodiments, the hardened olefin wax composition having an average olefin molecular weight between 350 grams/mole and 400 grams/mole has a needle penetration less than 30 dmm, alternatively less than 25 dmm, and alternatively less than 20 dmm.

In another further embodiment, the hardened olefin wax composition has an average olefin molecular weight between 360 grams/mole and 390 grams/mole and a needle penetration value less than 35 dmm. In other embodiments, the hardened olefin wax composition having an average olefin molecular weight between 360 grams/mole and 390 grams/mole has a needle penetration less than 30 dmm, alternatively less than 25 dmm, and alternatively less than 20 dmm.

Independently, the hardened olefin wax composition having an average olefin molecular weight between 330 grams/mole and 420 grams per mole can have a kinematic viscosity between about 3 cSt and about 15 cSt; in a further embodiment, between about 3.5 cSt and about 12 cSt; in still a further embodiment, between about 3.5 cSt and about 8 cSt; in yet a further embodiment, between about 3.75 cSt and about 6 cSt. Independently, the hardened olefin wax composition having an average olefin molecular weight between 350 grams/mole and 400 grams per mole can have a kinematic viscosity between about 3 cSt and about 15 cSt; in a further embodiment, between about 3.5 cSt and about 12 cSt; in still a further embodiment, between about 3.5 cSt and about 8 cSt; in yet a further embodiment, between about 3.75 cSt and about 6 cSt. Independently, the hardened olefin wax composition having an average olefin molecular weight between 360 grams/mole and 390 grams per mole can have a kinematic viscosity between about 3 cSt and about 15 cSt; in a further embodiment, between about 3.5 cSt and about 12 cSt; in still a further embodiment, between about 3.5 cSt and about 8 cSt; in yet a further embodiment, between about 3.75 cSt and about 6 cSt. Independently, the hardened olefin wax composition having an average olefin molecular weight between 330 grams/mole and 420 grams per mole, alternatively between 350 grams/mole and 400 grams/mole, and alternatively between 360 grams/mole and 390 grams/mole can have a drop melt point between about 50° C. and about 70° C. The hardened olefin wax composition may also have an acid number, saponification number, color or any combination of these as described above.

In one embodiment, the present invention relates to a hardened olefin wax composition having an average olefin molecular weight between 440 grams/mole and 550 grams/mole and a needle penetration value less than 10 dmm. In other embodiments, the hardened olefin wax composition having an average olefin molecular weight between 440 grams/mole and 550 grams/mole has a needle penetration less than 9 dmm, alternatively less than 7 dmm, and alternatively less than 5 dmm.

In another embodiment, the hardened olefin wax composition has an average olefin molecular weight between 460 grams/mole and 530 grams/mole and a needle penetration value less than 10 dmm. In other embodiments, the hardened olefin wax composition having an average olefin molecular weight between 460 grams/mole and 530 grams/mole has a needle penetration less than 9 dmm, alternatively less than 7 dmm, and alternatively less than 5 dmm.

In another embodiment, the hardened olefin wax composition has an average olefin molecular weight between 480 grams/mole and 510 grams/mole and a needle penetration value less than 10 dmm. In other embodiments, the hardened olefin wax composition having an average olefin molecular weight between 480 grams/mole and 510 grams/mole has a needle penetration less than 9 dmm, alternatively less than 7 dmm, and alternatively less than 5 dmm.

Independently, the hardened olefin wax composition having an average olefin molecular weight between 440 grams/mole and 550 grams per mole can have a kinematic viscosity between about 7 cSt and about 35 cSt, alternatively between about 7.5 cSt and about 30 cSt; in still a further embodiment, between about 7.5 cSt and about 25 cSt; in yet a further embodiment, between about 8 cSt and about 14 cSt. Independently, the hardened olefin wax composition having an average olefin molecular weight between 460 grams/mole and 530 grams per mole can have a kinematic viscosity between about 7 cSt and about 35 cSt, alternatively between about 7.5 cSt and about 30 cSt; in still a further embodiment, between about 7.5 cSt and about 25 cSt; in yet a further embodiment, between about 8 cSt and about 14 cSt. Independently, the hardened olefin wax composition having an average olefin molecular weight between 480 grams/mole and 510 grams per mole can have a kinematic viscosity between about 7 cSt and about 35 cSt, alternatively between about 7.5 cSt and about 30 cSt; in still a further embodiment, between about 7.5 cSt and about 25 cSt; in yet a further embodiment, between about 8 cSt and about 14 cSt. Independently, the hardened olefin wax composition having an average olefin molecular weight between 440 grams/mole and 550 grams per mole, alternatively between 460 grams/mole and 530 grams per mole, and alternatively between 480 grams/mole and 510 grams per mole may have a drop melt point between about 60° C. and about 80° C. The hardened olefin wax composition may also have an acid number, saponification number, color or any combination of these as described above.

The hardened olefin wax composition of any of the immediately foregoing embodiments can be non-oxidized, as quantified by an acid number less than 12 mg KOH/g hardened olefin wax composition or a saponification number less than 45 mg KOH/g hardened olefin wax composition, as described above. The hardened olefin wax composition of any of the immediately foregoing embodiments can comprise predominately any olefin wax composition described herein. In a non-limiting example, the hardened olefin wax composition can comprise an alpha olefin. Further, the hardened olefin wax composition can have an alpha olefin content greater than 50 mole percent. In a further embodiment, the hardened olefin wax composition has an alpha olefin content greater than 70 mole percent. In still a further embodiment, the hardened olefin wax composition has an alpha olefin content greater than 80 mole percent. In yet a further embodiment, the hardened olefin wax composition has an alpha olefin content greater than 90 mole percent.

A hardened olefin wax composition described herein can be used as a component of a polish, coating, candle, paint, ink, hot melt adhesive, investment casting composition, wood additive composition, or wax emulsion. In particular embodiments, the hardened olefin wax compositions can be used as polishes (such as floor waxes, furniture waxes, or automobile waxes, among others), coatings (such as textile lubricants or controlled release agents, among others), or inks, among others. These lists of uses are neither exhaustive nor limiting.

Oxidized Olefin Wax Compositions

Generally, another aspect of the present invention relates to an oxidized olefin wax composition, produced by a process comprising contacting a feedstock olefin wax composition with an oxygen-containing gas at a temperature greater than the melting point of the feedstock olefin wax composition. In an additional embodiment, the present invention relates to an oxidized olefin wax composition, produced by a process comprising contacting a feedstock olefin wax composition with an oxygen-containing gas at a temperature greater than the melting point of the feedstock olefin wax composition, wherein the oxidized olefin wax has an acid number greater than 1 mg KOH/g oxidized olefin wax composition and a kinematic viscosity, at 100° C., less than 70 cSt. In an additional embodiment, the present invention relates to an oxidized olefin wax composition, produced by a process comprising contacting a feedstock olefin wax composition comprising an olefin having at least 20 carbon atoms with an oxygen-containing gas at a temperature greater than the melting point of the feedstock olefin wax composition, wherein the oxidized olefin wax has an acid number greater than 1 mg KOH/g oxidized olefin wax composition and a kinematic viscosity, at 100° C., less than 70 cSt. Additional process steps and oxidized olefin wax composition parameters that further describe the invention are provided herein. Additional properties that describe the feedstock olefin wax subject to the oxidation process steps are also provided herein.

In an embodiment, the acid number of the oxidized olefin wax composition is greater than 1 mg KOH/g oxidized olefin wax composition. In another embodiment, the acid number of the oxidized olefin wax composition can be between 1 mg KOH/g oxidized olefin wax composition and 200 mg KOH/g oxidized olefin wax composition. In a further embodiment, the acid number can be between 2 mg KOH/g oxidized olefin wax composition and 100 mg KOH/g oxidized olefin wax composition. In still a further embodiment, the acid number can be between 4 mg KOH/g oxidized olefin wax composition and 50 mg KOH/g oxidized olefin wax composition.

In an embodiment, the kinematic viscosity, at 100° C., of the oxidized olefin wax composition can be less than 70 cSt. In another embodiment, the kinematic viscosity, at 100° C., of the oxidized olefin wax composition can be between 2 cSt and 70 cSt. In a further embodiment, the kinematic viscosity, at 100° C., of the oxidized olefin wax composition can be between 3 cSt and 50 cSt. In still a further embodiment, the kinematic viscosity, at 100° C., of the oxidized olefin wax composition can be between 5 cSt and 25 cSt.

In one embodiment, the oxidized olefin wax composition has a needle penetration value between 400 percent greater than and 75 percent less than the needle penetration value of the feedstock olefin wax composition. In a further embodiment, the oxidized olefin wax composition has a needle penetration from about 0 percent greater to about 400 percent greater than the needle penetration of the feedstock olefin wax composition. In yet a further embodiment, the oxidized olefin wax composition has a needle penetration from about 0 percent greater to about 300 percent greater than the needle penetration of the feedstock olefin wax composition. In still a further embodiment, the oxidized olefin wax composition has a needle penetration from about 0 percent greater to about 200 percent greater than the needle penetration of the feedstock olefin wax composition. In even a further embodiment, the oxidized olefin wax composition has a needle penetration from about 0 percent greater to about 100 percent greater than the needle penetration of the feedstock olefin wax composition.

Independently, in a further embodiment, the oxidized olefin wax composition can have a needle penetration value at least 5% less than the needle penetration value of the feedstock olefin wax. In yet a further embodiment, the oxidized olefin wax composition can have a needle penetration value at least 10% less than the needle penetration value of the feedstock olefin wax composition. In still a further embodiment, the oxidized olefin wax composition can have a needle penetration value at least 20% less than the needle penetration value of the feedstock olefin wax composition. In even a further embodiment, the oxidized olefin wax composition can have a needle penetration value at least 30% less than the needle penetration value of the feedstock olefin wax composition. In even yet a further embodiment, the oxidized olefin wax composition can have a needle penetration value at least 40% less than the needle penetration value of the feedstock olefin wax composition. In even still a further embodiment, the oxidized olefin wax composition can have a needle penetration value at least 50% less than the needle penetration value of the feedstock olefin wax composition.

In one embodiment, the oxidized olefin wax composition has a drop melt point that is substantially unchanged from that of the feedstock olefin wax composition.

The oxidized olefin wax compositions of the present invention can be used in applications similar to those described above. In light of the present disclosure of the properties of the olefin wax compositions, additive-hardened olefin wax compositions, and hardened olefin wax compositions, and oxidized olefin wax compositions of the present invention, the skilled artisan can routinely determine which wax may be suitable or desirable for a particular use.

Hardened Olefin Wax Compositions—Method for Producing

Generally, the hardened olefin wax compositions are produced by contacting a feedstock olefin wax composition with an oxygen-containing gas. Additional process parameters which may be used to define the process to produce the hardened olefin wax compositions may include the oxygen content of the oxygen-containing gas, the temperature at which the feedstock olefin wax composition and oxygen-containing gas are contacted, the time for which the oxygen-containing gas and the feedstock olefin wax composition are contacted, and whether or not the feedstock olefin wax composition is mixed, stirred, or agitated during contact with the oxygen-containing gas. The independently variable process parameters and hardened olefin wax composition properties provided herein may be used to further describe the processes and compositions of the invention.

In one embodiment, the present invention relates to a process to produce a hardened olefin wax composition comprising contacting a feedstock olefin wax composition comprising an olefin having at least 20 carbon atoms with an oxygen-containing gas at a temperature greater than the feedstock olefin wax composition melting point. In another embodiment, the present invention relates to a process to produce a hardened olefin wax composition, comprising contacting a feedstock olefin wax composition comprising an olefin having at least 20 carbon atoms with an oxygen-containing gas at a temperature greater than the feedstock olefin wax composition melting point, to produce a hardened olefin wax composition, wherein the hardened olefin wax composition has a needle penetration value at 25° C. at least 5 percent less than the needle penetration value at 25° C. of the feedstock olefin wax composition. The description of the feedstock olefin wax composition and hardened olefin wax composition are described herein and are generally applicable to the process of producing the hardened olefin wax compositions of this embodiment. Details regarding the contacting step and process conditions that are generally applicable to the process of producing the hardened olefin wax composition are described below.

The oxygen-containing gas may be any gas containing oxygen. The oxygen-containing gas can be pure oxygen, oxygen diluted with an inert gas, air, or air diluted with an inert gas, among others. Nitrogen and noble gases may be referred to herein as "inert gases." Exemplary mixtures of oxygen diluted with an inert gas or gases include, but are not limited to, mixtures of oxygen and nitrogen, mixtures of oxygen and argon, mixtures of oxygen and other noble gases, or mixtures of oxygen, nitrogen, and argon, among others. In one embodiment, all gases other than oxygen in the mixture are selected from nitrogen or noble gases.

In one embodiment, the oxygen-containing gas can comprise less than 50 percent oxygen. In a further embodiment, the oxygen-containing gas can comprise less than 22 percent oxygen. In another embodiment, the oxygen-containing gas is air.

The contacting of the feedstock olefin wax composition and the oxygen-containing gas can involve any technique known to the skilled artisan. Such techniques can include, but are not limited to, sparging the gas through the melted feedstock olefin wax composition (with or without mixing, stirring, or other agitation of the melted wax) or providing the gas to the surface of the melted wax with or without mixing, stirring, or other agitation of the melted feedstock olefin wax composition, among others.

The contacting step can be conducted at any air flow rate and duration capable of producing the hardened olefin wax compositions described herein.

In an embodiment, the contacting step for producing the hardened olefin wax composition comprises contacting air with the feedstock olefin wax composition at an air flow rate greater than 0.1 CFH/kg feedstock olefin wax composition. In a further embodiment, the air flow rate is between 0.1 CFH/kg feedstock olefin wax composition and 15 CFH/kg feedstock olefin wax composition. In a further embodiment, the air flow rate is between 0.25 CFH/kg feedstock olefin wax composition and 15 CFH/kg feedstock olefin wax composition. In a further embodiment, the air flow rate is between 0.5 CFH/kg feedstock olefin wax composition and 10 CFH/kg feedstock olefin wax composition. In a further embodiment, the air flow rate is between 0.75 CFH/kg feedstock olefin wax composition and 8 CFH/kg feedstock olefin wax composition. In a further embodiment, the air flow rate is between 1.0 CFH/kg feedstock olefin wax composition and 5 CFH/kg feedstock olefin wax composition.

In an embodiment, the contacting step for producing the hardened olefin wax composition can have a duration greater than about 1 minute. In a further embodiment, the contacting step can have a duration between about 1 minute and 12 hours. In a further embodiment, the contacting step can have a duration between about 1 minute and 8 hours. In a further embodiment, the contacting step can have a duration between about 1 minute and 4 hours. In a further embodiment, the contacting step can have a duration between about 1 minute and 2 hours. In a further embodiment, the contacting step can have a duration between about 1 minute and 1 hour.

In other embodiments, the melted feedstock olefin wax composition and the oxygen-containing gas can be mixed, stirred, or agitated to increase the intimacy of contact therebetween.

In a separate embodiment, the contacting step for producing the hardened olefin wax composition is conducted at low air flows. In one low air flow embodiment, the contacting step for producing the hardened olefin wax composition comprises contacting air with the feedstock olefin wax composition at an air flow rate less than 0.1 cubic feet per hour (CFH)/kg feedstock olefin wax composition and without substantial agitation of the feedstock olefin wax composition. In this low airflow embodiment, the contacting step can have a duration greater than about 1 day. In a further embodiment, the contacting step can have a duration between about 1 day and about 60 days. In a further embodiment, the contacting step can have a duration between about 2 days and about 45 days. In a further embodiment, the contacting step can have a duration between about 3 days and about 30 days.

The contacting step for producing the hardened olefin wax composition can be conducted at a temperature greater than the feedstock olefin wax composition melting point. In one embodiment, the feedstock olefin wax composition and the oxygen-containing gas are contacted at a temperature between the melting point of the feedstock olefin wax composition and 300° C. In a further embodiment, the feedstock olefin wax composition and the oxygen-containing gas are contacted at a temperature between about 80° C. and 300° C. In a further embodiment, the feedstock olefin wax composition and the oxygen-containing gas are contacted at a temperature between about 100° C. and 250° C. In a further embodiment, the feedstock olefin wax composition and the oxygen-containing gas are contacted at a temperature between about 180° C. and 230° C. In a further embodiment, the feedstock olefin wax composition and the oxygen-containing gas are contacted at a temperature between about 200° C. and 220° C.

The contacting step can be performed in the presence or absence of a catalyst. In some embodiments the contacting step is performed in the absence of an added catalyst. In other embodiments, the contacting step can be performed in the presence of a catalyst. In the catalytic embodiment the catalyst may comprise manganese or cobalt, among others.

This process is generally capable of producing a hardened olefin wax composition having a having a needle penetration lower than that of the feedstock olefin wax composition. Additionally, the hardened olefin wax composition can have additional properties selected from the group consisting of low acid numbers, low saponification numbers, substantially unchanged to slightly higher relative kinematic viscosities, and substantially unchanged relative drop melt points, and combinations thereof as described herein.

After production of the hardened olefin wax composition, the process can further comprise storing the hardened olefin wax composition under an inert gas (i.e., nitrogen, a noble gas, or a mixture thereof). In one embodiment, the inert gas is nitrogen.

After production of the hardened olefin wax composition, the process can further comprise combining the hardened olefin wax composition with at least one antioxidant. Exemplary antioxidants include, but are not limited to, 2,6-di(t-butyl)-4-methylphenol (BHT), BHT derivatives, alkylated diphenylamine, alkylated diphenylamine derivatives, N-Phenyl-1-naphthylamine, N-Phenyl-1-naphthylamine derivatives, 1,2,3,4,-tetrahydroxybenzene (THB), Irganox 1010, and Irganox 1076. The antioxidant can be incorporated into the hardened olefin wax composition at a concentration from about 25 ppm to about 2,500 ppm.

Oxidized Olefin Wax Compositions—Method for Producing

Generally, the oxidized olefin wax compositions are produced by contacting a feedstock olefin wax composition with an oxygen-containing gas. Additional process parameters which may be used to define the process to produce the oxidized olefin wax compositions may include the oxygen content of the oxygen-containing gas, the temperature at which the feedstock olefin wax composition and oxygen-containing gas are contacted, the time for which the oxygen-containing gas and the feedstock olefin wax composition are contacted, and whether or not the feedstock olefin wax composition is mixed, stirred, or agitated during contact with the oxygen-containing gas. These independently variable process parameters are further described herein.

In one embodiment, the present invention relates to a process to oxidize an olefin wax composition, comprising contacting a feedstock olefin wax composition comprising an olefin having at least 20 carbon atoms with an oxygen-containing gas at a temperature greater than that of the feedstock olefin wax composition melting point. In another embodiment, the present invention relates to a process to oxidize an olefin wax composition, comprising contacting a feedstock olefin wax composition comprising an olefin having at least 20 carbon atoms with an oxygen-containing gas at a temperature greater than that of the feedstock olefin wax composition melting point, to prepare an oxidized olefin wax composition wherein the oxidized olefin wax composition has an acid number greater than 1 mg KOH/g oxidized olefin wax composition and a kinematic viscosity at 100° C. less than 70 cSt. The feedstock olefin wax composition and oxidized olefin wax composition properties are described herein and are generally applicable to the process to produce the oxidized olefin wax compositions. Process parameters such as the applicable oxygen-containing gases, contact modes (agitation methods), and presence or absence of catalyst are generally similar as those discuses in the process for producing the hardened olefin waxes. However, the contacting step temperature and airflow rates for the process to produce the oxidized olefin wax compositions differ from the contacting step temperature and airflow rates to produce the hardened olefin wax compositions, and those differences are set forth below.

The temperature of the contacting step to produce the oxidized olefin wax composition can be between the feedstock olefin wax composition melting point and 300° C. In a further embodiment, the contacting step can be performed at a temperature between about 80° C. and about 300° C. In a further embodiment, the contacting step can be performed at a temperature between about 80° C. and about 200° C. In a further embodiment, the contacting step can be performed at a temperature between about 90° C. and about 180° C. In a further embodiment, the contacting step can be performed at a temperature between about 100° C. and about 160° C. In a further embodiment, the contacting step can be performed at a temperature between about 110° C. and about 150° C.

In another embodiment, the contacting step for producing the oxidized olefin wax composition comprises contacting air with the feedstock olefin wax composition at an air flow rate greater than 0.1 CFH/kg feedstock olefin wax composition. In a further embodiment, the air flow rate is between 0.1 CFH/kg feedstock olefin wax composition and 30 CFH/kg feedstock olefin wax composition. In a further embodiment, the air flow rate is between 0.5 CFH/kg feedstock olefin wax composition and 20 CFH/kg feedstock olefin wax composition. In a further embodiment, the air flow rate is between 1.0 CFH/kg feedstock olefin wax composition and 15 CFH/kg feedstock olefin wax composition. In a further embodiment, the air flow rate is between 1.5 CFH/kg feedstock olefin wax composition and 12 CFH/kg feedstock olefin wax. In a further embodiment, the air flow rate is between 2 CFH/kg feedstock olefin wax composition and 10 CFH/kg feedstock olefin wax composition.

In an embodiment, the contacting step for the process for producing an oxidized olefin wax composition can have a duration between 1 minute and 48 hours. In a further embodiment, the duration is between 2 hours and 30 hours. In a further embodiment, the duration is between 4 hours and 24 hours.

In a separate embodiment, the contacting step for producing the oxidized olefin wax composition is performed at a low air flow. In this low flow embodiment, the contacting step comprises contacting air with the feedstock olefin wax composition at an air flow rate less than 0.1 CFH/kg feedstock olefin wax composition and without substantial agitation of the feedstock olefin wax composition. In this embodiment, the duration of the contacting step can be greater than 1 day.

The contacting step yields an oxidized olefin wax composition, which may further comprise other compounds, such as volatile compounds. In one embodiment, the process can further comprise removing volatile compounds from the oxidized olefin wax composition by one or more of vacuum, heat, nitrogen sparging, or contacting with activated charcoal, clay, alumina, or two or more thereof.

Specifically, the oxidized olefin wax composition can be devolatilized by transfer to an appropriate vessel and connecting the vessel to a vacuum apparatus, such as a Kugelrohr rotovap apparatus consisting an air oven, a vacuum pump, and a rotating mechanism to effect a thin film evaporation function (manufactured by Barnstead International and distributed by Aldrich, Model No. Z40-115-3). The volatiles can be stripped off by a combination of vacuum (less than 5 mmHg) and heat, such as maintaining the oven temperature from about 140° C. to about 220° C. for a duration from about 1 hr to about 12 hr, such as 3 hr.

In one embodiment, the oxidized olefin wax composition may be devolatilized by applying a vacuum to a vessel comprising the oxidized olefin wax composition. In another embodiment, the oxidized olefin wax composition may be devolatilized by applying a vacuum and heat to a vessel comprising the oxidized olefin wax composition. In still another embodiment, the oxidized olefin wax composition is mixed, stirred, or agitated during the vacuum devolatilization step. In yet another embodiment, a sparging gas is passed through the oxidized olefin wax composition during the vacuum devolatilization step. The sparging gas can be an inert gas such as nitrogen, argon, or combinations thereof. In yet another embodiment, the vacuum devolatilization step may be performed using a wiped film evaporator. Two or more of heat, agitation, sparging, and wiped film evaporation can be applied during vacuum devolatilization.

The oxidized olefin wax composition has been described above. The acid number and kinematic viscosity of the oxidized olefin wax composition can be as described above.

The Feedstock Olefin Wax

The terms olefin wax composition and feedstock olefin wax composition may be used interchangeably to describe the compositions subject to the inventions described herein. Generally, the term olefin wax composition is used when the composition is physically mixed with another material, for example an additive, while the term feedstock olefin wax composition is used when the composition is the subject of a process, for example contact with an oxygen-containing gas. Thus, the olefin wax compositions described herein also describe the feedstock olefin composition described herein unless explicitly described otherwise.

The olefin wax composition or the feedstock olefin wax composition can be any composition comprising an olefin having at least 20 carbon atoms. Generally, an olefin is a hydrocarbon with at least one carbon-carbon double bond. In some embodiments, the olefin wax composition comprises an alpha olefin. An alpha olefin is a hydrocarbon with a carbon-carbon double bond at the terminal position. In other embodiments the olefin wax composition comprises an internal olefin. In other embodiments the olefin wax composition comprises linear internal olefins. In yet other embodiments the olefin wax composition comprises a normal alpha olefin. A normal alpha olefin is an alpha olefin having a straight chain of carbon atoms (i.e. no carbon chain branches) and a carbon-carbon double bond at the terminal position. Additional criteria which may be independently applied, either singly or in any combination, to the olefin wax include the olefin wax composition's average olefin molecular weight, olefin wax composition carbon number composition, alpha olefin content, internal olefin content, linear internal olefin content, vinylidene olefin content, needle penetration, drop melt point, and viscosity, among others, are discussed below.

The olefin wax or feedstock olefin wax may comprise one or more olefins, as described above. In one embodiment, the olefin wax composition or feedstock olefin wax composition comprises greater than 30 mole % olefins having at least 20 carbon atoms. In a further embodiment, the olefin wax composition comprises greater than 45 mole % olefins having at least 20 carbon atoms. In yet a further embodiment, the olefin wax composition comprises greater than 60 mole % olefins having at least 20 carbon atoms. In still a further embodiment, the olefin wax composition comprises greater than 75 mole % olefins having at least 20 carbon atoms. In even a further embodiment, the olefin wax composition comprises greater than 90 mole % olefins having at least 20 carbon atoms. In even still a further embodiment, the olefin wax composition comprises greater than 95 mole % olefins having at least 20 carbon atoms. In yet another embodiment, the olefin wax composition consists essentially of olefin having at least 20 carbon atoms.

The olefin wax composition or feedstock olefin wax composition mole % olefin compositions are not limited to olefins having at least 20 carbon atoms. The olefin mole % values of the compositions may also be applied to the olefin wax composition and feedstock olefin wax composition embodiments having the olefin carbon number compositions and/or the average olefin molecular weight ranges as described herein.

In some embodiments, the components of the olefin wax composition or feedstock olefin wax composition contains a paraffin wax in addition to the olefin wax. In further embodiments, the olefin wax composition may contain a paraffin wax having greater than 20 carbon atoms. In yet further embodiments, the olefin wax composition contains less than 65 mole % paraffins having greater than 20 carbon atoms; alternatively, 50 mole % paraffins having greater than 20 carbon atoms; alternatively, 35 mole % paraffins having greater than 20 carbon atoms; alternatively, 20 mole % paraffins having greater than 20 carbon atoms; alternatively, 8 mole % paraffins having greater than 20 carbon atoms; and alternatively, 5 mole % paraffins having greater than 20 carbon atoms.

The olefin wax composition or feedstock olefin wax composition mole % paraffin contents are not limited to olefins having at least 20 carbon atoms. The paraffin mole % values of the compositions may also be applied to same carbon number compositions and/or the average molecular weight ranges as the olefin carbon number compositions and/or the average olefin molecular weight ranges described herein.

In some embodiments, the olefin wax composition or feedstock olefin wax composition comprises alpha olefins. In one embodiment, the olefin wax composition comprises greater than 30 mole % alpha olefins having at least 20 carbon atoms. In a further embodiment, the olefin wax composition comprises greater than 45 mole % alpha olefins having at least 20 carbon atoms. In yet a further embodiment, the olefin wax composition comprises greater than 60 mole % alpha olefins having at least 20 carbon atoms. In still a further embodiment, the olefin wax composition comprises greater than 75 mole % alpha olefins having at least 20 carbon atoms. In even a further embodiment, the olefin wax composition comprises greater than 90 mole % alpha olefins having at least 20 carbon atoms. In even still a further embodiment, the olefin wax composition comprises greater than 95 mole % alpha olefins having at least 20 carbon atoms.

The olefin wax composition or feedstock olefin composition wax alpha olefin compositions are not limited to olefins having at least 20 carbon atoms. The alpha olefin mole % values of the compositions may also be applied to the olefin wax composition and feedstock olefin wax composition embodiments having the olefin carbon number compositions and/or the carbon number ranges and average olefin molecular weight ranges as described herein.

The olefin wax composition comprises olefins and/or alpha olefins with carbon number distributions, alpha olefin contents, molecular weight distributions, and needle penetration values as described herein.

In one embodiment, the olefin wax composition or feedstock olefin wax composition comprises greater than 70 wt % olefins having from 20 to 24 carbon atoms. In a further embodiment, the olefin wax composition comprises greater than 80 wt % olefins having from 20 to 24 carbon atoms. In still a further embodiment, the olefin wax composition comprises greater than 85 wt % percent olefins having from 20 to 24 carbon atoms. In yet a further embodiment, the olefin wax composition comprises greater than 90 wt % olefins having from 20 to 24 carbon atoms. In still a further embodiment, the olefin wax composition comprises greater than 95 wt % olefins having from 20 to 24 carbon atoms.

In one embodiment, the olefin wax composition or feedstock olefin wax composition comprises greater than 50 wt % olefins having from 24 to 28 carbon atoms. In a further embodiment, the olefin wax composition comprises greater than 60 wt % olefins having from 24 to 28 carbon atoms. In a further embodiment, the olefin wax composition comprises greater than 70 wt % olefins having from 24 to 28 carbon atoms. In yet a further embodiment, the olefin wax composition comprises greater than 80 wt % olefins having from 24 to 28 carbon atoms. In still a further embodiment, the olefin wax composition comprises greater than 90 wt % olefins having from 24 to 28 carbon atoms.

In one embodiment, the olefin wax composition or feedstock olefin wax composition comprises greater than 50 wt % olefins having from 26 to 28 carbon atoms. In a further embodiment, the olefin wax composition comprises greater than 60 wt % olefins having from 26 to 28 carbon atoms. In a further embodiment, the olefin wax composition comprises greater than 70 wt % olefins having from 26 to 28 carbon atoms. In yet a further embodiment, the olefin wax composition comprises greater than 80 wt % olefins having from 26 to 28 carbon atoms. In still a further embodiment, the olefin wax composition comprises greater than 90 wt % olefins having from 26 to 28 carbon atoms.

In one embodiment, the olefin wax composition or feedstock olefin wax composition comprises greater than 70 wt % olefins having at least 30 carbon atoms. In a further embodiment, the olefin wax composition comprises greater than 80 wt % olefins having at least 30 carbon atoms. In still a further embodiment, the olefin wax composition comprises greater than 85 wt % percent olefins having from at least 30 carbon atoms. In yet a further embodiment, the olefin wax composition comprises greater than 90 wt % olefins having at least 30 carbon atoms. In still a further embodiment, the olefin wax composition comprises greater than 95 wt % olefins having at least 30 carbon atoms.

Alternatively, the olefin wax composition or feedstock olefin wax composition may be described as an olefin wax composition having a particular average molecular weight of the olefin components thereof. In some embodiments, the olefin wax composition has an average olefin molecular weight greater than 260 grams/mole. In yet another embodiment, the olefin wax composition has an average olefin molecular weight greater than 330 grams/mole. In yet another embodiment, the olefin wax composition has an average olefin molecular weight greater than 400 grams/mole. In other embodiments, the olefin wax composition has an average olefin molecular weight between 260 grams/mole and 340 grams/mole; alternatively, between 280 grams/mole and 320 grams/mole; alternatively, between 290 grams/mole and 310 grams/mole. In another embodiment, the olefin wax composition has an average olefin molecular weight between 330 grams/mole and 420 grams/mole; alternatively, between 350 grams/mole and 400 grams/mole; alternatively, between 360 grams/mole and 390 grams/mole. In yet another embodiment, the olefin wax composition has an average olefin molecular weight between 440 grams/mole and 550 grams/mole; alternatively, between 460 grams/mole and 530 grams/mole; alternatively, between 480 grams/mole and 510 grams/mole.

Commercially available olefin waxes commonly contain a number of alpha olefins having at least about 20 carbon atoms, alpha olefins having at least about 20 carbon atoms, as well as other compounds (smaller alpha olefins, smaller normal alpha olefins, internal olefins, vinylidene, or others). For example, Alpha Olefin $C_{20-24}$ (Chevron Phillips Chemical Company LP, The Woodlands, Tex.) comprises from about 35-55 wt % $C_{20}$ olefin, about 25-45 wt % $C_{22}$ olefin, about 10-26 wt % $C_{24}$ olefin, about 3 wt % olefins smaller than $C_{20}$, and about 2 wt % olefins larger than $C_{24}$. Alpha Olefin $C_{20-24}$ is an exemplary olefin wax within the definition "comprising an olefin having at least 20 carbon atoms" as used herein. The invention is not limited to this or any other particular commercially available olefin wax. Also, an olefin wax consisting essentially of an olefin having 20 carbon atoms (or another olefin having a particular number of carbon atoms greater than 20) can also be used in the present invention.

In one embodiment, the olefin wax composition comprises an olefin having from about 20 carbon atoms to about 24 carbon atoms. In another embodiment, the olefin wax composition comprises an olefin having from about 26 carbon atoms to about 28 carbon atoms. In yet another embodiment the olefin wax composition comprises an olefin having from about 26 to about 28 carbon atoms. In an additional embodiment, the olefin wax composition comprises an olefin having at least 30 carbon atoms.

Commercially available olefin waxes may further comprise vinylidene or internal olefins, up to as much as about 40-50 wt % of the wax. In one embodiment, and regardless of the number of carbons in the olefin, the olefin wax is a high alpha (HA) AO wax. By "HA wax" is meant a wax comprising (a) one or more alpha olefins and (b) less than about 20 wt % vinylidene or internal olefins.

Independently, commercially available olefin wax compositions may further comprise non-olefin hydrocarbons, such as paraffins (hydrocarbons wherein all bonds between carbon atoms are single bonds). Other components known in the art to acceptably be present in olefin waxes can be present as well. For example, some applicable olefin wax compositions and/or feedstock olefin wax composition may contain oxygenated components such as alcohols, aldehydes, and ketones, among others. Thus, oxygenated components may not impact the generally observed decrease in the needle penetration of the hardened olefin wax compositions or the oxidized olefin wax compositions described herein.

Known olefin waxes include olefin streams from ethylene oligomerization, cracked heavy waxes (e.g. Fischer-Tropsch waxes), and mixtures of paraffins and olefins, among others. Additionally, the olefin wax compositions and/or the feedstock olefin wax compositions may include Fischer-Tropsch waxes comprising a mixture of paraffin waxes and olefin waxes which meet the describe olefin wax composition and/or feedstock olefin wax compositions described herein. One source of commercially available Fischer-Tropsch waxes is Sasol, Johannesburg, South Africa.

In some embodiments, the olefin wax composition or feedstock olefin wax composition comprises commercially available normal alpha olefin waxes. In other embodiments, the olefin wax composition consists essentially of commercially available normal alpha olefin waxes. One source of commercially available alpha olefin waxes is Chevron Phillips Chemical Company LP, The Woodlands, Tex. The following are published physical and chemical characteristics of the normal alpha olefin waxes Alpha Olefin $C_{20-24}$, Alpha Olefin $C_{24-28}$, Alpha Olefin $C_{26-28}$, Alpha Olefin $C_{30+}$, and Alpha Olefin $C_{30+HA}$, which are provided for illustrative purposes as exemplary feedstock olefin waxes. The invention is not limited to these particular feedstock olefin waxes.

| Characteristic | Typical Value (Typical Range) | | | | |
| --- | --- | --- | --- | --- | --- |
| | $C_{20-24}$ | $C_{24-28}$ | $C_{26-28}$ | $C_{30+}$ | $C_{30+HA}$ |
| Drop melt point, °F. (ASTM D 127) | 96 (ASTM D 87) | 143 (140-158) | 125 (122-130) | 162 (154-174) | 159 (150-164) |
| Oil content (MEK extraction), wt. % | | 3.7 (3.0-5.1) | 3.8 (3.2-5.3) | 1.50 (1.0-2.0) | 1.5 (1.2-3.0) |
| Needle Penetration @ 77° F., dmm | 150 | 59 (48-70) | 48 (40-60) | 13 (11-17) | 15.5 (12-18) |
| Needle Penetration @ 100° F., dmm | | | | 24 (18-30) | 32 (24-44) |
| Needle Penetration @ 110° F., dmm | | | | 34 (25-50) | 40 (30-56) |
| Flash Point (ASTM D 93) | 362° F. (183° C.) | 425° F. (218° C.) | 417° F. (214° C.) | 485° F. (252° C.) | 432° F. (222° C.) |
| Saybolt Color | 30 | 25 | 30 | 20+ | 20+ |
| Kinematic Viscosity @ 100° C., cSt | 2.0 (1.8-2.2) | 3.5 (3.2-4.0) | 3.4 (3.2-3.6) | 6.5 (5.0-10.0) | 6.4 (5.0-9.0) |
| % Alpha olefins ($^1$H-NMR) | 86 (83-92) | 54 (40-60) | 79 (70-82) | 62 (50-65) | 76 (70-81) |
| % Vinylidenes ($^1$H-NMR) | 8 (6-15) | 30 (25-55) | 16 (11-17) | 30 (25-45) | 18 (15-25) |
| % Internal olefins ($^1$H-NMR) | 3 (2-5) | 18 (10-22) | 3 (2-8) | 10 (5-20) | 5.3 (4-10) |
| Drop melt point, °F. (ASTM D 127) | 96* | 154 | 125 | 164 | 150 |
| Oil content (MEK extraction), wt. % | | 4.60 | 5.00 | 1.50 | 1.5 |
| Needle Penetration @ 77° F., dmm | 150 | 59 | 48 | 13 | 15.5 |
| Needle Penetration @ 100° F., dmm | | | | 24 | 32 |
| Needle Penetration @ 110° F., dmm | | | | 34 | 40 |
| Flash Point (ASTM D 93) | 362° F. (183° C.) | 425° F. (218° C.) | 417° F. (214° C.) | 485° F. (252° C.) | 432° F. (222° C.) |
| Saybolt Color | 30 | 25 | 30 | 20+ | 20+ |

The following examples are included to demonstrate preferred embodiments of the invention. It should be appreciated by those of skill in the art that the techniques disclosed in the examples which follow represent techniques discovered by the inventors to function well in the practice of the invention. However, those of skill in the art should, in light of the present disclosure, appreciate that many changes can be made in the specific embodiments which are disclosed and still obtain a like or similar result without departing from the spirit and scope of the invention.

Examples 1-8 relate to hardened olefin waxes.

Example 1

500 g of normal alpha olefin wax C30+ (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 220° C. and the agitation was set at 400 rpm. A stream of air was then introduced below the wax liquid at 1 CFH. The reaction was maintained at 220° C. for 30 min. The contents were allowed to cool to 100° C. and were discharged. The resulting material appeared as a white solid.

| Properties | Control | Example 1 |
| --- | --- | --- |
| Needle Penetration Number at 25° C., dmm (ASTM D1321) | 13 | 4 |
| Saponification Number, mg KOH/g (ASTM D 94) | <1 | <1 |
| Acid Number, mg KOH/g (ASTM D 974) | <1 | <1 |
| Melt Viscosity at 100° C., cSt (ASTM D 445) | 7.3 | 8.3 |
| Drop Melting Point, ° C. (ASTM D 127) | 77 | 72 |

Example 2

500 g of normal alpha olefin wax C30+ (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 220° C. and the agitation was set at 400 rpm. A stream of air was then introduced below the wax liquid at 1 CFH. The reaction was maintained at 220° C. for 1 hour. The contents were allowed to cool to 100° C. and were discharged. The resulting material appeared as a white solid.

| Properties | Control | Example 2 |
|---|---|---|
| Needle Penetration Number at 25° C., dmm (ASTM D1321) | 13 | 3 |
| Saponification Number, mg KOH/g (ASTM D 94) | <0.5 | 3.5 |
| Acid Number, mg KOH/g (ASTM D 974) | <0.2 | 1.4 |
| Melt Viscosity at 100° C., cSt (ASTM D 445) | 7.3 | 10.5 |
| Drop Melting Point, ° C. (ASTM D 127) | 77 | 73 |

Example 3

500 g of normal alpha olefin wax C30+HA (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 220° C. and the agitation was set at 400 rpm. A stream of air was then introduced below the wax liquid at 1 CFH. The reaction was maintained at 220° C. for 30 min. The contents were allowed to cool to 100° C. and were discharged. The resulting material appeared as a white solid.

| Properties | Control | Example 3 |
|---|---|---|
| Needle Penetration Number at 25° C., dmm (ASTM D1321) | 14 | 6.5 |
| Saponification Number, mg KOH/g (ASTM D 94) | <0.5 | 0.7 |
| Acid Number, mg KOH/g (ASTM D 974) | <0.2 | 1.0 |
| Melt Viscosity at 100° C., cSt (ASTM D 445) | 7 | 11 |
| Drop Melting Point, ° C. (ASTM D 127) | 71 | 70 |

Example 4

500 g of normal alpha olefin wax C26/28 (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 220° C. and the agitation was set at 400 rpm. A stream of air was then introduced below the wax liquid at 1 CFH. The reaction was maintained at 220° C. for 15 min. The contents were allowed to cool to 100° C. and were discharged. The resulting material appeared as a white solid.

| Properties | Control | Example 4 |
|---|---|---|
| Needle Penetration Number at 25° C., dmm (ASTM D1321) | 45 | 23 |
| Saponification Number, mg KOH/g (ASTM D 94) | <0.5 | <0.5 |
| Acid Number, mg KOH/g (ASTM D 974) | <0.2 | <0.2 |
| Melt Viscosity at 100° C., cSt (ASTM D 445) | 3.4 | 4 |
| Drop Melting Point, ° C. (ASTM D 127) | 52 | 52 |

Example 5

500 g of normal alpha olefin wax C30+ (Chevron Phillips Chemical Company LP) was placed into a four-neck flask, which was equipped with a heating mantle, a thermocouple, a single blade agitator, and a side arm connected to a receiving flask. The wax was heated to 220° C. and the agitation was set at 100 rpm. A stream of air was then introduced above the surface of wax liquid at 4 CFH. The reaction was maintained at 220° C. for 3 hour. The contents were allowed to cool to 100° C. and were discharged. The resulting material appeared as a white solid.

| Properties | Control | Example 5 |
|---|---|---|
| Needle Penetration Number at 25° C., dmm (ASTM D1321) | 13 | 4 |
| Saponification Number, mg KOH/g (ASTM D 94) | <0.5 | <0.5 |
| Acid Number, mg KOH/g (ASTM D 974) | <0.2 | <0.2 |
| Melt Viscosity at 100° C., cSt (ASTM D 445) | 7.3 | 11.9 |
| Drop Melting Point, ° C. (ASTM D 127) | 77 | 74 |

Example 6

500 g of normal alpha olefin wax C30+HA (Chevron Phillips Chemical Company LP) was placed into a four-neck flask, which was equipped with a heating mantle, a thermocouple, a single blade agitator, and a side arm connected to a receiving flask. The wax was heated to 220° C. and the agitation was set at 100 rpm. A stream of air was then introduced above the surface of wax liquid at 4 cubic feet per hour. The reaction was maintained at 220° C. for 4 hour. The contents were allowed to cool to 100° C. and were discharged. The resulting material appeared as a white solid.

| Properties | Control | Example 6 |
|---|---|---|
| Needle Penetration Number at 25° C., dmm (ASTM D1321) | 14 | 5 |
| Saponification Number, mg KOH/g (ASTM D 94) | <0.5 | <0.5 |
| Acid Number, mg KOH/g (ASTM D 974) | <0.2 | 0.3 |
| Melt Viscosity at 100° C., cSt (ASTM D 445) | 7 | 13.7 |
| Drop Melting Point, ° C. (ASTM D 127) | 71 | 69 |

Example 7

200 g of normal alpha olefin wax C30+ (Chevron Phillips Chemical Company LP) in a 500 ml beaker was placed in an oven (Constant Temperature Oven, Model D-K 63, Baxter) with oven-temperature set at 120° C. The wax contents were allowed to stay in the oven for 20 days in the presence of air. The contents were allowed to cool to 100° C. and were discharged. The resulting material appeared as a white solid.

| Properties | Control | Example 7 |
|---|---|---|
| Needle Penetration Number at 25° C., dmm (ASTM D1321) | 13 | 4 |
| Saponification Number, mg KOH/g (ASTM D 94) | <0.5 | 3.0 |
| Acid Number, mg KOH/g (ASTM D 974) | <0.2 | 2.5 |
| Melt Viscosity at 100° C., cSt (ASTM D 445) | 7.3 | 10.6 |
| Drop Melting Point, ° C. (ASTM D 127) | 77 | 75 |

Example 8

200 g of normal alpha olefin wax C30+HA (Chevron Phillips Chemical Company LP) in a 500 ml beaker was placed in an oven (Constant Temperature Oven, Model D-K 63, Baxter) with oven-temperature set at 120° C. The wax contents were allowed to stay in the oven for 20 days in the presence of air. The contents were allowed to cool to 100° C. and were discharged. The resulting material appeared as a white solid.

| Properties | Control | Example 8 |
|---|---|---|
| Needle Penetration Number at 25° C., dmm (ASTM D1321) | 14 | 6 |
| Saponification Number, mg KOH/g (ASTM D 94) | <0.5 | <0.5 |
| Acid Number, mg KOH/g (ASTM D 974) | <0.2 | 1.8 |
| Melt Viscosity at 100° C., cSt (ASTM D 445) | 7 | 10.7 |
| Drop Melting Point, ° C. (ASTM D 127) | 71 | 69 |

Examples 1-8 report the unexpected result that hardened AO waxes with relatively low viscosity can be produced by treatments that are either relatively high temperature and short duration (Examples 1-6) or relatively low temperature, very long duration, and very low air flow rate (contact with a headspace of air) (Examples 7-8).

Examples 9-16 relate to oxidized olefin waxes.

Example 9

500 g of normal alpha olefin wax C30+ (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 130° C. and the agitation was set at 400 rpm. Then a steady stream of air was introduced at 1.7 CFH. The reaction was maintained at 130° C. for 24 hours. The contents were allowed to cool to 100° C. and were discharged. The resulting material appeared as a white to light yellow solid.

| Properties | Control | Example 9 |
|---|---|---|
| Needle Penetration Number at 25° C., dmm (ASTM D1321) | 13 | 6 |
| Saponification Number, mg KOH/g (ASTM D 94) | <1 | 45 |
| Acid Number, mg KOH/g (ASTM D 974) | <1 | 15 |
| Melt Viscosity at 100° C., cSt (ASTM D 445) | 7.3 | 16.6 |
| Drop Melting Point, ° C. (ASTM D 127) | 77 | 74 |

Example 10

500 g of normal alpha olefin wax C30+HA (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 130° C. and the agitation was set at 400 rpm. Then a steady stream of air was introduced at 1.7 CFH. The reaction was maintained at 130° C. for 24 hours. The contents were allowed to cool to 100° C. and were discharged. The resulting material appeared as a white to light yellow solid.

| Properties | Control | Example 10 |
|---|---|---|
| Needle Penetration Number at 25° C., dmm (ASTM D1321) | 14 | 13 |
| Saponification Number, mg KOH/g (ASTM D 94) | <0.5 | 50 |
| Acid Number, mg KOH/g (ASTM D 974) | <0.2 | 17 |
| Melt Viscosity at 100° C., cSt (ASTM D 445) | 7 | 13.3 |
| Drop Melting Point, ° C. (ASTM D 127) | 71 | 71 |

Example 11

500 g of normal alpha olefin wax C30+ (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 8 hours. The contents were allowed to cool to 100° C. and were discharged. The resulting material appeared as a white solid.

| Properties | Control | Example 11 |
|---|---|---|
| Needle Penetration Number at 25° C., dmm (ASTM D1321) | 13 | 12 |
| Saponification Number, mg KOH/g (ASTM D 94) | <0.5 | 97 |
| Acid Number, mg KOH/g (ASTM D 974) | <0.2 | 37 |
| Melt Viscosity at 100° C., cSt (ASTM D 445) | 7.3 | 25 |
| Drop Melting Point, ° C. (ASTM D 127) | 77 | 74 |

Example 12

500 g of normal alpha olefin wax C30+HA (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 8 hours. The contents were allowed to cool to 100° C. and were discharged. The resulting material appeared as a white solid.

| Properties | Control | Example 12 |
|---|---|---|
| Needle Penetration Number at 25° C., dmm (ASTM D1321) | 14 | 14 |
| Saponification Number, mg KOH/g (ASTM D 94) | <0.5 | 68 |
| Acid Number, mg KOH/g (ASTM D 974) | <0.2 | 28 |
| Melt Viscosity at 100° C., cSt (ASTM D 445) | 7 | 22.8 |
| Drop Melting Point, ° C. (ASTM D 127) | 71 | 70 |

Example 13

500 g of normal alpha olefin wax C26/28 (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 8 hours. The contents were allowed to cool to 100° C. and were discharged. The resulting material appeared as a white solid.

| Properties | Control | Example 13 |
|---|---|---|
| Needle Penetration Number at 25° C., dmm (ASTM D1321) | 45 | 33 |
| Saponification Number, mg KOH/g (ASTM D 94) | <0.5 | 91 |
| Acid Number, mg KOH/g (ASTM D 974) | <0.2 | 40 |
| Melt Viscosity at 100° C., cSt (ASTM D 445) | 3.4 | 15.5 |
| Drop Melting Point, ° C. (ASTM D 127) | 51 | 60 |

Example 14

500 g of normal alpha olefin wax C30+ (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 24 hours. The contents were allowed to cool to 100° C. and were discharged. The resulting material appeared as a yellow solid.

| Properties | Control | Example 14 |
|---|---|---|
| Needle Penetration Number at 25° C., dmm (ASTM D1321) | 13 | 20 |
| Saponification Number, mg KOH/g (ASTM D 94) | <0.5 | 150 |
| Acid Number, mg KOH/g (ASTM D 974) | <0.2 | 46 |
| Melt Viscosity at 100° C., cSt (ASTM D 445) | 7.3 | 70.5 |
| Drop Melting Point, ° C. (ASTM D 127) | 77 | 70 |

Example 15

500 g of normal alpha olefin wax C30+HA (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 24 hours. The contents were allowed to cool to 100° C. and were discharged. The resulting material appeared as a white solid.

| Properties | Control | Example 15 |
|---|---|---|
| Needle Penetration Number at 25° C., dmm (ASTM D1321) | 14 | 14 |
| Saponification Number, mg KOH/g (ASTM D 94) | <0.5 | 136 |
| Acid Number, mg KOH/g (ASTM D 974) | <0.2 | 44 |
| Melt Viscosity at 100° C., cSt (ASTM D 445) | 7 | 65.9 |
| Drop Melting Point, ° C. (ASTM D 127) | 71 | 68 |

Example 16

500 g of normal alpha olefin wax C26/28 (Chevron Phillips Chemical Company LP) was placed into a four-neck flask, which was equipped with a heating mantle, a thermocouple, a single blade agitator, an air sparger (cylindrical, 1" in length and ⅜" in diameter, average pore size 15 μm), and a side arm connected to a receiving flask. The wax was heated to 145° C. and the agitation was set at 400 rpm. Then a steady stream of air was introduced at 3.4 CFH. The reaction was maintained at 145° C. for 24 hours. The contents were allowed to cool to 100° C. and were discharged. The resulting material appeared as a white solid.

| Properties | Control | Example 16 |
|---|---|---|
| Needle Penetration Number at 25° C., dmm (ASTM D1321) | 45 | 55 |
| Saponification Number, mg KOH/g (ASTM D 94) | <0.5 | 177 |
| Acid Number, mg KOH/g (ASTM D 974) | <0.2 | 40 |
| Melt Viscosity at 100° C., cSt (ASTM D 445) | 3.4 | 56.3 |
| Drop Melting Point, ° C. (ASTM D 127) | 51 | 55 |

Examples 17-20

Mixtures of an alpha olefin wax and an additive, having the proportions indicated in the table below, were each placed in an oven and occasionally agitated to obtain a clear solution. The samples were allowed to cool to room temperature to provide a solid wax mixture. The samples were then tested for needle penetration and drop melt point. Needle penetrations, at 25° C., for the mixtures were measured using ASTM D1321. Drop melt points for the mixtures were measured using ASTM D 127.

| Example | Wax (wt. %) | Additive (wt. %) | Needle Penetration (dmm) | Drop Melt Point (° C.) |
|---|---|---|---|---|
| 17 (Control) | CPChem Alpha Olefin 30 + HA (100 wt. %) | — | 16.5 dmm | 71 |
| 18 | CPChem Alpha Olefin 30 + HA (90 wt. %) | Stearic Acid (10 wt. %) | 21.5 dmm | 71 |

| Example | Wax (wt. %) | Additive (wt. %) | Needle Penetration (dmm) | Drop Melt Point (° C.) |
|---|---|---|---|---|
| 19 | CPChem Alpha Olefin 30 + HA (90 wt. %) | Polyanhydride 24-28 (10 wt. %) | 23.5 dmm | 69 |
| 20 | CPChem Alpha Olefin 30 + HA (90 wt. %) | Ethylene-bis-stearamide (10 wt. %) | 10 dmm | >100 |

Example 21-26

Mixtures of an alpha olefin wax and ethylene-bis-stearamide (EBSA, 98%, from Aldrich), having the proportions indicated in the table below, were each placed in a beaker and heated in an oven at 140° C. A clear solution was obtained in half hour from occasional agitation with a stirring rod. The samples were allowed to cool to room temperature giving a white solid. The samples were then tested for needle penetration and kinematic viscosity. Needle penetrations, at 25° C., for the mixtures were measured using ASTM D 1321. Kinematic viscosities for the mixtures were measured using ASTM D 445.

| Example | Wax (wt. %) | Ethylene-bis-stearamide | Needle Penetration | Viscosity (Temperature) |
|---|---|---|---|---|
| 21 (Control) | CPChem Alpha Olefin 26-28 (100 wt. %) | — | 44 dmm | 3.5 (100° C.) |
| 22 | CPChem Alpha Olefin 26-28 (98 wt. %) | 2 wt. % | 32 dmm | 2.2 (140° C.) |
| 23 | CPChem Alpha Olefin 26-28 (95 wt. %) | 5 wt. % | 30 dmm | 2.3 (140° C.) |
| 24 (Control) | CPChem Alpha Olefin 30+ (100 wt. %) | — | 14 dmm | 7.0 (100° C.) |
| 25 | CPChem Alpha Olefin 30+ (98 wt. %) | 2 wt. % | 12 dmm | 4.2 (140° C.) |
| 26 | CPChem Alpha Olefin 30+ (95 wt. %) | 5 wt. % | 12 dmm | 4.1 (140° C.) |

Example 27

Mixtures of alpha olefin waxes and ethylene-bis-stearamide, having the compositions indicated in the table below, were prepared using a similar procedure as used in Examples 21-26. The samples were then tested for needle penetration and drop melt point. Needle penetrations, at 25° C., for the mixtures were measured using ASTM D1321. Drop melt points for the mixtures were measured using ASTM D 127.

| Ethylene-Bis-Stearamide (wt. %) | CPChem Alpha Olefin 20-24 | | CPChem Alpha Olefin 26-28 | | CPChem Alpha Olefin 30+ HA | | CPChem Alpha Olefin 30 + | |
|---|---|---|---|---|---|---|---|---|
| | Needle Penetration (dmm) | Drop Melt Point (° C.) | Needle Penetration (dmm) | Drop Melt Point (° C.) | Needle Penetration (dmm) | Drop Melt Point (° C.) | Needle Penetration (dmm) | Drop Melt Point (° C.) |
| 0 wt. % (Control) | 160.5 | 35.6 | 48.5 | 50.6 | 16.5 | 70.6 | 12 | 77.2 |
| 1 | 108 | 66 | 34.5 | 97 | 11.5 | 99 | 8.5 | 99 |
| 2 | 91 | 78 | 28.5 | 99 | 12.5 | 107 | 6 | 102 |
| 5 | 81.5 | 78 | 26.5 | 110 | 9.5 | 114 | — | 113 |
| 10 | 85 | 111 | 29.5 | 117 | 10 | 121 | 5.5 | 120 |

All of the compositions and methods disclosed and claimed herein can be made and executed without undue experimentation in light of the present disclosure. While the compositions and methods of this invention have been described in terms of particular embodiments, it will be apparent to those of skill in the art that variations may be applied to the compositions and methods and in the steps or in the sequence of steps of the methods described herein without departing from the concept, spirit and scope of the invention as defined by the appended claims.

What is claimed is:

1. A hardened olefin wax composition produced from a feedstock olefin wax composition by contacting the feedstock olefin wax composition with an oxygen-containing gas at a temperature greater than a melting point of the feedstock olefin wax composition, the hardened olefin wax composition having:
   a needle penetration value at 25° C. at least 5 percent less than a needle penetration value at 25° C. of the feedstock olefin wax composition;
   a kinematic viscosity at 100° C. of up to about 200% greater than the kinematic viscosity of the feedstock olefin wax composition; and
   a saphonification number less than 5 mg KOH/g hardened olefin wax composition.

2. The hardened olefin wax composition of claim 1, wherein the feedstock olefin wax is an alpha olefin wax.

3. The hardened olefin wax composition of claim 2, wherein the alpha olefin wax has an average olefin molecular weight between 260 grams/mole and 340 grams/mole, and the hardened olefin wax composition has a needle penetration at 25° C. less than 100 dmm.

4. The hardened olefin wax composition of claim 3, having an acid number less than 12 mg KOH/g hardened olefin wax composition.

5. A hardened olefin wax composition of claim 2, wherein the alpha olefin wax has an average olefin molecular weight between 330 and 420 grams/mole, and the hardened olefin wax composition has a needle penetration at 25° C. less than 35 dmm.

6. The hardened olefin wax composition of claim 5, having a kinematic viscosity at 100° C. between 3 cSt and 15 cSt.

7. The hardened olefin wax composition of claim 5, having an acid number less than 12 mg KOH/g.

8. The hardened olefin wax composition of claim 5, having a kinematic viscosity at 100° C. between 3 cSt and 15 cSt and having an acid number less than 12 mg KOH/g hardened olefin wax composition.

9. The hardened olefin wax composition of claim 2, wherein the alpha olefin wax has an average olefin molecular weight between 440 grams/mole and 550 grams/mole, and the hardened olefin wax composition has a needle penetration at 25° C. less than 10 dmm.

10. The hardened olefin wax composition of claim 9, having kinematic viscosity at 100° C. between 7 cSt and 35 cSt.

11. The hardened olefin wax composition of claim 9, having an acid number less than 12 mg KOH/g hardened olefin wax composition.

12. The hardened olefin wax composition of claim 9, having kinematic viscosity at 100° C. between 7 cSt and 35 cSt and having an acid number less than 12 mg KOH/g hardened olefin wax composition.

13. A process to produce a hardened olefin wax composition, comprising:
   contacting a feedstock olefin wax composition with an oxygen-containing gas at a temperature greater than a melting point of the feedstock olefin wax composition, to produce a hardened olefin wax composition,
   wherein the hardened olefin wax composition has a needle penetration value at 25° C. at least 5 percent less than a needle penetration value at 25° C. of the feedstock olefin wax composition, the hardened olefin wax composition has a kinematic viscosity at 100° C. up to about 200% greater than the kinematic viscosity of the feedstock olefin wax composition, and the hardened olefin wax composition has a saphonification number less than 5 mg KOH/g hardened olefin wax composition.

14. The process of claim 13, wherein the feedstock olefin wax is an alpha olefin wax.

15. The process of claim 13, wherein the feedstock olefin wax composition and the oxygen-containing gas are contacted at a temperature between the melting point of the feedstock olefin wax composition and 300° C.

16. The process of claim 13, wherein the oxygen-containing gas is selected from the group consisting of pure oxygen, oxygen diluted with an inert gas, air, and air diluted with an inert gas.

17. The process of claim 16, wherein the contacting step comprises contacting air with the feedstock olefin wax at an air flow less than 0.1 cubic feet/hour/kg feedstock olefin wax composition and without substantial agitation of the feedstock olefin wax composition.

18. The process of claim 17, wherein the contacting step has a duration greater than 1 day.

19. The process of claim 16, wherein the contacting step comprises contacting air with the feedstock olefin wax at an air flow is between 0.1 cubic feet/hour/kg feedstock olefin wax composition and 15 cubic feet/hour/kg feedstock olefin wax composition.

20. The process of claim 19, wherein the contacting step has a duration is between 1 minute and 12 hours.

* * * * *